(12) United States Patent
Pires Cabado et al.

(10) Patent No.: US 9,200,733 B2
(45) Date of Patent: Dec. 1, 2015

(54) SPLICING RING FOR TUBULAR HIGH-PRESSURE FLUID CONDUITS

(71) Applicants: Barbara Ines Pires Cabado, Alella (ES); Elisabet Patricia Pires Cabado, Barcelona (ES)

(72) Inventors: Barbara Ines Pires Cabado, Alella (ES); Elisabet Patricia Pires Cabado, Barcelona (ES)

( * ) Notice: Subject to any disclaimer, the term of this patent is extended or adjusted under 35 U.S.C. 154(b) by 230 days.

(21) Appl. No.: 13/720,247

(22) Filed: Dec. 19, 2012

(65) Prior Publication Data

US 2013/0181444 A1    Jul. 18, 2013

(30) Foreign Application Priority Data

Jan. 16, 2012   (ES) .............................. 201230038 U

(51) Int. Cl.
| | |
|---|---|
| *F16L 17/04* | (2006.01) |
| *F16L 19/04* | (2006.01) |
| *F16L 17/03* | (2006.01) |
| *F16L 21/02* | (2006.01) |
| *F16L 21/06* | (2006.01) |

(52) U.S. Cl.
CPC ............. *F16L 19/046* (2013.01); *F16L 17/032* (2013.01); *F16L 17/04* (2013.01); *F16L 21/022* (2013.01); *F16L 21/06* (2013.01)

(58) Field of Classification Search
USPC .................................. 285/111, 112, 379, 373
See application file for complete search history.

(56) References Cited

U.S. PATENT DOCUMENTS

| | | | | |
|---|---|---|---|---|
| 3,116,078 | A * | 12/1963 | Scherer .......................... | 285/104 |
| 4,629,217 | A * | 12/1986 | Straub ............................ | 285/112 |
| 5,273,322 | A * | 12/1993 | Straub ............................ | 285/112 |
| 5,280,969 | A * | 1/1994 | Straub ............................ | 285/105 |
| 5,310,223 | A * | 5/1994 | Straub ............................ | 285/112 |
| 6,070,914 | A * | 6/2000 | Schmidt ......................... | 285/112 |
| 7,490,871 | B2 * | 2/2009 | Avram et al. .................. | 285/420 |
| 7,748,753 | B2 * | 7/2010 | Krausz et al. ................. | 285/373 |
| 2003/0020276 | A1 * | 1/2003 | Steele ............................ | 285/111 |
| 2005/0258641 | A1 * | 11/2005 | Gibb ............................. | 285/112 |

FOREIGN PATENT DOCUMENTS

| | | |
|---|---|---|
| ES | 2 212 732 | 7/2004 |
| ES | 1 072 963 | 10/2010 |
| GB | 2 393 768 | 4/2004 |

\* cited by examiner

*Primary Examiner* — James Hewitt
(74) *Attorney, Agent, or Firm* — Michael J. Striker

(57) ABSTRACT

A splicing ring for tubular high-pressure fluid conduits includes an inner metal ring formed of two independent and identical band halves having side edges. The side edges are folded downwards at a right angle and are configured as positioning and retaining elements of an O-ring. The O-ring rests upon the ends of the two tubular conduits to be spliced.

5 Claims, 1 Drawing Sheet

SPLICING RING FOR TUBULAR HIGH-PRESSURE FLUID CONDUITS

CROSS REFERENCE TO RELATED APPLICATION

The invention described and claimed hereinbelow is also described in Spanish patent application No. U201230038 filed on Jan. 16, 2012. This Spanish Patent Application, whose subject matter is incorporated here by reference, provides the basis for a claim of priority of invention under 35 U.S.C. 119 (a)-(d).

BACKGROUND OF THE INVENTION

The object of the present invention is a splicing ring destined for joining tubular conduits, generally cylindrical pipes used to convey high-pressure fluids, the essential characteristics of which are described below.

Conveying high-pressure fluids by means of tubular conduits requires ensuring the maximum guarantee of safety at the splice points of one segment of the conduit to another. Although in these types of conduits segments of considerable length can be installed, obtained by joining, with adequate welds, various unit elements until reaching said lengths, for the purpose of reducing splices to a minimum, splicing elements are nevertheless necessary for joining segments of longer length that ensure a full hermetic seal and the flexibility required to absorb the expansions and movements caused by the pressure whereto the conduit is subjected by the passage of the fluid through the interior thereof, said fluid circulating at high pressure.

In order to install these conduits, the use of tubes manufactured by thermoplastic material extrusion having the adequate physical and chemical characteristics to resist the aggression of the fluid products, both liquids and gases, which are transported at high pressure, and the aggression of the outer elements, both whether the conduit is installed outdoors or buried, is becoming increasingly frequent. Likewise, the material used to manufacture these conduits must be able to withstand the pressures that can arise once installed and during operation thereof.

Different types of splice joints are known to exist in the current state of the art, both unit tube elements and segments of longer length, aimed at configuring a conduit suitable for transporting fluids at high pressure.

Patent ES200202246 discloses flanges for joining the smooth ends of two conduits or unit tubes wherein a full hermetic seal is guaranteed through the use of metal rings that rest upon and are riveted to the surface of the tubes. However, the ultimate aim of obtaining a fully hermetic joint is limited in terms of security due to the fact that the conduits can expand or contract due to temperature changes, particularly those conduits manufactured from polypropylene, which are highly sensitive to temperature changes.

Mention should also be made of Utility Model U 2010030655, which discloses flanges for splicing tubes used to convey fluids at high pressure, formed by an inner metal ring, generally divided into two halves with folded ends for disposing locking bands and fixed to each other, upon installation of the rings, by welding.

The drawback of this embodiment is that the edges of the O-ring disposed beneath the rings are not sufficiently protected, which causes excessive deterioration, added to the fact that the weld points are limited and do not offer a total guarantee of stability and fixation of the outer rings over the inner rings.

SUMMARY OF THE INVENTION

The splicing ring for tubular high-pressure fluid conduits, object of the present invention, offers an adequate solution to the drawbacks of known devices mentioned in the preceding paragraphs. Two metal rings having preformed edges are disposed underneath the inner metal band of the ring, which lock around the entire perimeter of both edges of the O-ring of the assembly, protecting said edges and avoiding deterioration thereof.

Likewise, the welded joint between the outer and inner metal rings will be enhanced thanks to elongated dies made in the outer band and there will be a greater line of contact between the two bands, as described below.

Therefore, the splicing ring object of this invention presents a double band divided into two halves, identical and joined together in their entirety, having the adequate thickness for their tightening function, being fully and perfectly adaptable, in a diametrical direction, to the outer perimeter of the tubular conduits to be spliced, whereupon sufficient pressure can be exerted along said perimeter to prevent any accidental movement of the ends of the tubular conduits due to the pressures that can originate in the splicing area.

It also has two bands that are fitted over the edges of the O-ring of the assembly to protect these.

BRIEF DESCRIPTION OF THE DRAWINGS

With the object of completing the foregoing description, drawings wherein, by way of non-limiting example, a practical embodiment of the ring object of this invention has been represented.

In said drawings.

DETAILED DESCRIPTION OF THE PREFERRED EMBODIMENTS

Figure 1:
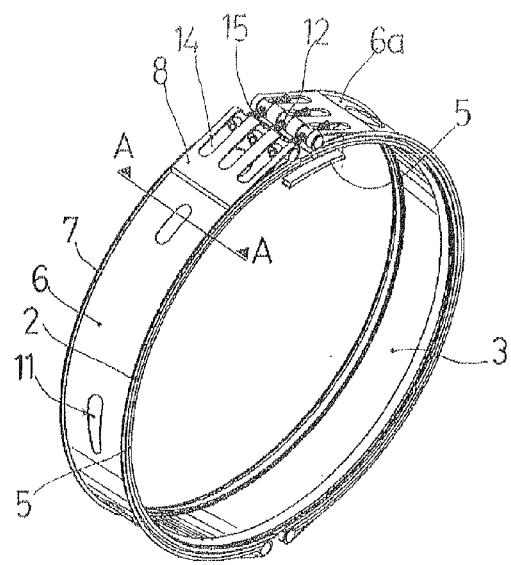
FIG. 1 shows a perspective view of the splicing ring being described, showing a detail of part of one of the bands that cover the edge of the O-ring, in cross-section and separated from its final location.
Figure 3:
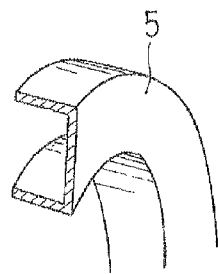
FIG. 3 shows a cross-sectional detail of one of bands that protect the edges of the O-ring, duly expanded for the sake of clarity.
Figure 2:
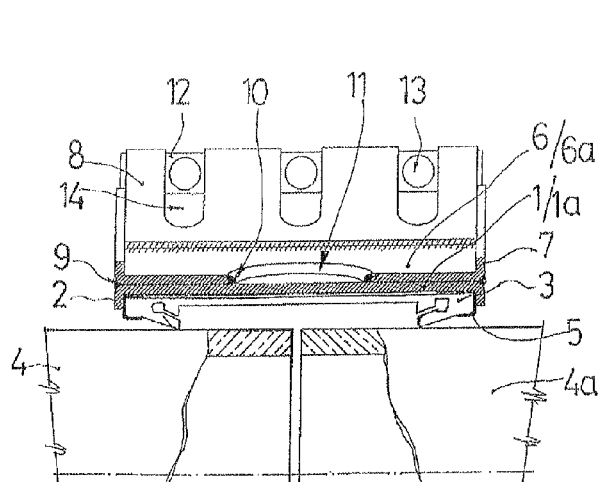
FIG. 2 shows a partial and cross-sectional view of the ring, along the AA cutting line, completely mounted and installed on the ends of the tubular conduits being spliced.
Figure 4:
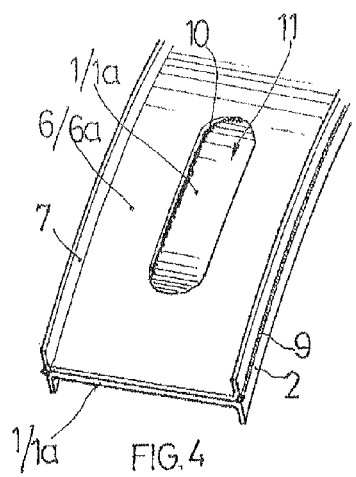
FIG. 4 finally, shows a detail of one of the die-cut areas on the outer band for allowing welding to the corresponding inner band.

In accordance with the aforementioned drawings, the splicing ring for tubular conduits destined for conveying high-pressure fluids, liquids or gases, consists of a metal band, formed in the example represented by two independent and identical halves or bands —1— and —1a—, the side edges —2— of which are folded downwards in a right angle, constituting the edges that retain the relevant O-ring —3— in position. Said O-ring —3— has a known, characteristic and adequate profile for ensuring a hermetic seal in the splicing area of the two opposing tubular conduits —4— and —4a—.

The edges of the O-ring —3— are advantageously covered throughout their outer perimeter by two protective metal bands —5— preformed into a U shape to adapt and fully adjust to said perimeter edges of the O-ring —3—, offering full protection to the aforementioned edges and preventing deterioration thereof.

The splicing ring is completed by a second outer band, manufactured from the same material as the inner band —1/1a—, also consisting of two halves —6— and —6a—, the side edges —7— of which are folded upwards in a right angle. All the band halves, both inner and outer, are disposed coincidentally and in such a manner that the outer bands —6— and —6a— are overlapping the inner bands —1— and —1a—, the outer bands having two extensions on each of their four ends to constitute folds —8— that constitute the housings of the locking and tightening bands of the splicing ring.

Once the outer and inner band halves are positioned, as indicated earlier, during the manufacturing process thereof the outer band halves —6— and —6a— are permanently fixed over the inner band halves —1— and —1a— by means of welds. Firstly, spot welding —9— is carried out along the perimeter of the coincident edges, on either side of the bands and, secondly, spot welding —10— is carried out on the upper surface of the inner bands —1— and —1a— coincident with the edge of counterbores —11—, having elongated contours, made in the outer band halves —6— and —6a—. These welds provide a high degree of robustness both along the coincident side edges and in the central part of the bands themselves.

Finally, cylindrical pins —12— disposed beneath the folds —8— which the outer bands have on the edges thereof constitute the fastening and tightening elements of the splicing ring, both pins being disposed parallel and in opposition to each other, having coincident orifices —13— positioned opposite indentations —14— in the folded ends —8— for disposing the threaded studs —15— which allow the splicing ring to open and close, acting thereupon with a threading or unthreading action.

It will be understood that each of the elements described above, or two or more together, may also find a useful application in other types of methods and constructions differing from the types described above.

While the invention has been illustrated and described as embodied in a splicing ring for tubular high-pressure fluid conduits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A splicing ring for tubular high-pressure fluid conduits, comprising:
    an inner metal ring formed of two independent and identical band halves having opposing side edges, wherein said opposing side edges are folded downwards at a right angle,
    an O-ring having a characteristic ring shape and profile, and opposing perimeter edges, and
    two metal protective bands, each preformed in a U shape,
    wherein the U-shaped metal protective bands receive and cover the opposing perimeter edges of the O-ring, and
    wherein each of the U-shaped metal protective bands abut against one of each of the downwardly folded side edges of the inner metal ring so that said O-ring is positioned between the downwardly folded side edges of the inner metal ring and rests upon ends of two tubular high-pressure fluid conduits to be spliced.

2. The splicing ring for tubular high-pressure fluid conduits as defined in claim 1, wherein said U-shaped metal protective bands are configured to fit tightly over an entire perimeter of said side edges of the O-ring.

3. The splicing ring for tubular high-pressure fluid conduits as defined in claim 1, further comprising a second outer band formed from two band halves with outer edges that are folded upwards in a right angle, disposed coincidentally and overlapping the inner band halves, said outer band halves having the same number of folds to house locking and tightening bands of the splicing ring.

4. The splicing ring for tubular high-pressure fluid conduits as defined in claim 3, wherein the inner band halves and the outer band halves overlap and are joined via welding lines along coincident edges, on either side of the bands, and via further welding lines, wherein the further welding lines are formed on an upper face of the inner band halves, coincident with edges of elongated counterbores formed in the outer band halves.

5. The splicing ring for tubular high-pressure fluid conduits as defined in claim 3, further comprising two cylindrical pins parallel and oppositely disposed to orifices coincident with indentations in the folds, said cylindrical pins being disposed in an interior of folds at ends of the outer band halves and being configured to position threaded pins, wherein said threaded pins are formed with threaded or unthreaded regions configured to cause the splicing ring to open or close.

* * * * *